United States Patent [19]

Terazawa et al.

[11] Patent Number: 5,076,385
[45] Date of Patent: Dec. 31, 1991

[54] THROTTLE CONTROL APPARATUS

[75] Inventors: Tadashi Terazawa; Yasuhiro Kobayashi, both of Aichi, Japan

[73] Assignee: Aisin Seiki K.K., Aichi, Japan

[21] Appl. No.: 622,577

[22] Filed: Dec. 5, 1990

[30] Foreign Application Priority Data

Dec. 5, 1989 [JP] Japan .................................. 1-317181

[51] Int. Cl.$^5$ ............................................. B60K 31/00
[52] U.S. Cl. ..................................... 180/197; 123/399; 123/400
[58] Field of Search ................ 123/399, 400; 180/197; 364/426.03

[56] References Cited

U.S. PATENT DOCUMENTS 4,721,176  1/1988  Kabasim et al. ...................... 180/197
4,889,093 12/1989  Nishiyama et al. .................. 123/400
4,919,097  4/1990  Mitvi et al. ........................... 123/400

Primary Examiner—Kenneth R. Rice
Assistant Examiner—Victor E. Johnson
Attorney, Agent, or Firm—Sughrue, Mion, Zinn, Macpeak & Seas

[57] ABSTRACT

A throttle control apparatus for use with an automotive internal combustion engine. The apparatus assures that the drive wheels are stopped from spinning on a snowy road surface if the driver pushes down on the accelerator pedal. The apparatus comprises an accelerator operation mechanism including the accelerator pedal, a first throttle-driving means capable of opening and closing the throttle valve, a controller, a second driving means, and a fuel-cutting means. The first throttle-driving means is mounted independent of the accelerator operation mechanism and includes a driving plate, a clutch plate, and a movable yoke. The controller controls the first throttle-driving means to adjust the throttle opening. When the first throttle-driving means becomes inoperative, the throttle valve can be driven by the accelerator operation mechanism via the second throttle-driving means. The fuel-cutting means is operated when excessive spin of the drive wheels is detected.

2 Claims, 7 Drawing Sheets

S1: Initialize
S2: Perform Input Processing
S3: Control Mode?
S4: Normal Accel. Control
S5: Constant Speed Drive Control
S6: Accel. Skid Control
S7: Idling Speed Control
S8: Final Processing
S9: Torque Control
S10: Cornering Control
S11: Failure Processing Diagnosis Control
S12: Perform Output Processing

THROTTLE CONTROL APPARATUS

FIELD OF THE INVENTION

The present invention relates to a throttle control apparatus mounted to an internal combustion engine and, more particularly, to a throttle control apparatus which uses a driving means such as an electric motor to open or close a throttle valve according to the position of the accelerator pedal, for providing various kinds of control such as cruise control.

BACKGROUND OF THE INVENTION

In a carburetor, a throttle valve for use with an internal combustion engine controls the volume of air-fuel mixture, for controlling the output of the engine. In an electronic fuel-injection system, such a throttle valve controls the amount of inhaled air, for controlling the output of the engine. The throttle valve is designed to interlock with the accelerator operation mechanism including the accelerator pedal.

In the past, the accelerator operation mechanism has been mechanically coupled to the throttle valve. In recent years, an apparatus has been proposed in which the throttle valve is opened or closed according to the position of the accelerator pedal by a driving means interlocking with a driving power source such as a motor. For example, Japanese Patent Laid-Open No. 145867/1980 discloses an apparatus in which a stepping motor is connected with the throttle valve and driven according to the position of the accelerator pedal.

Japanese Patent Laid-Open No. 153945/1984 recites countermeasures taken when the electronically controlled actuator driving the above-described stepping motor becomes uncontrollable. For instance, one countermeasure consists in disconnecting the throttle shaft from the electronically controlled actuator by a solenoid clutch and returning the throttle valve to its closed position by a return spring. In the prior art techniques, when the electronically controlled actuator no longer controls the motor, any driving means which opens or closes the throttle valve is not available. Therefore, the vehicle cannot be moved into a desired location for repair. In view of this drawback, a countermeasure has been proposed in Japanese Patent Laid-Open No. 153945/1980.

More specifically, a solenoid clutch is mounted between the throttle shaft and the rotating shaft that is rotated when the driver pushes down on the accelerator pedal. When the solenoid clutch is energized, it disconnects the throttle shaft from the rotating shaft. When the clutch is not energized, it connects the throttle shaft with the rotating shaft. A control circuit is provided to detect an abnormality in the control operation of the electronically controlled actuator. When such an abnormality is detected, the control circuit actuates a relay to deenergize the actuator and the solenoid clutch. If the actuator becomes uncontrollable, the throttle shaft is mechanically coupled to the accelerator pedal via the clutch.

In the technique described in Japanese Patent Laid-Open No. 153945/1984, uncontrollableness of the electronically controlled actuator is detected by the separate control circuit, which then deenergizes the actuator and the solenoid clutch. The above-cited Japanese patent specification further says that, when the actuator no longer controls the motor, the rotating shaft mechanically coupled to the accelerator pedal is coupled to the throttle shaft via the solenoid clutch. In the operation of the example described in the patent specification, when the electronically controlled actuator no longer controls the motor, the motor produces no driving torque. Therefore, when the driver presses down on the accelerator pedal, the throttle valve is opened or closed without hindrance. In this way, after the accelerator pedal has been pressed, the throttle valve is kept coupled to the actuator.

The solenoid clutch used in this prior art apparatus is large in size because of its structure. Also, the clutch is expensive to fabricate. Furthermore, the situation may get worse than the case in which the electronically controlled actuator becomes uncontrollable. That is, the possibility that the control circuit malfunctions cannot be totally excluded. For example, the throttle valve might be kept open by electromagnetic interference. In this case, even if a separate switching means is provided, and if the throttle shaft is connected to the accelerator pedal while deenergizing the solenoid clutch, then any means which causes the throttle valve to be closed against the action of the throttle shaft driven by the actuator does not exist. Therefore, it is difficult to secure a desired throttle opening. If the above-described circumstance occurs, it is the common practice for the driver to stop pressing down on the accelerator pedal and to push down on the brake pedal. In the conventional apparatus described above, the throttle valve is kept driven by the actuator.

In view of the foregoing problems, the present applicant has proposed an improved throttle control apparatus in Japanese patent application No. 22190/1989. In particular, if stoppage of operation of the accelerator pedal is detected, and if the present throttle opening is found to be in excess of the given opening, the driving means is separated from the throttle valve with certainty. The driving power source is stopped from controlling the throttle valve. The throttle valve can be directly driven within a given range of opening by operating the accelerator operation mechanism by more than a certain amount.

When a vehicle is traveling on a road covered with snow or other road surface having a low friction coefficient, if the vehicle is started or accelerated suddenly, then the drive wheels may spin due to excessive driving force, so that the directional stability of the vehicle is lost. To prevent this phenomenon, the traction is sometimes controlled to stop the drive wheels from spinning on acceleration. One specific known means for controlling the traction is to cut the supply of fuel to the engine as described in Japanese Patent Laid-Open No. 265428/1987. Another known means is to control the brakes and the throttle opening simultaneously. The former means for cutting the supply of fuel is installed on a vehicle equipped with an electronic fuel-injection system. The energization of the injector is controlled according to the condition of spin of the drive wheels by the electronic controller to limit the supply of fuel.

On the other hand, in the above-described throttle control apparatus that adjusts the throttle opening by the driving means such as a motor, the traction can also be controlled during control of the throttle valve by the driving means. Referring to FIG. 9($a$), a reference speed $V_s$ indicated by the dot-and-dash line has been set according to the speed of the driven wheels. The speed $V_w$ of the drive wheels is indicated by the solid line. If the speed $V_w$ of the drive wheels increases suddenly because they spin on acceleration, then the throttle opening is reduced rapidly to fully close the valve so that the speed Vw may approach the reference speed Vs. Hence, sufficient traction and lateral drag can be obtained. In FIG. 9, the phantom lines indicate the accelerator opening Ac that is determined by the amount by which accelerator operation mechanism is operated. The broken lines indicate the throttle opening Th.

In the above-described throttle control apparatus which can directly drive the throttle valve within the given range of opening, if the traction is controlled on acceleration to stop the drive wheels from spinning by the driving means in the same way as the foregoing, and if the driver operates the accelerator operation mechanism by more than a given amount to directly drive the throttle valve, then the throttle valve is not closed as shown in FIG. 9(b). For this reason, it is impossible to make the speed Vw of the drive wheels approach the reference speed Vs immediately. As a result, it takes long to stop the drive wheels from spinning.

SUMMARY OF THE INVENTION

It is an object of the invention to provide a throttle control apparatus which permits an automotive throttle valve to be directly driven by operating the accelerator operation mechanism when the throttle-driving means becomes inoperative and which can certainly prevent the drive wheels from spinning on acceleration if the accelerator operation mechanism is operated.

The above object is achieved by a throttle control apparatus comprising: an accelerator operation mechanism; a first throttle-driving means which is mounted independent of the accelerator operation mechanism and capable of opening and closing the throttle valve of a vehicle; a control means which controls the first throttle-driving means according to the operating conditions of the internal combustion engine and of the vehicle and based on a first intended throttle opening corresponding to the amount by which the accelerator operation mechanism is operated, the control means acting to set a second intended throttle opening for securing a given slip ratio and then to control the first throttle-driving means when excessive spin of the drive wheels is detected on acceleration of the vehicle; a second throttle-driving means which, when the first throttle-driving means becomes inoperative and the accelerator operation mechanism is operated by more than a given amount, permits the throttle valve to be directly driven within a given range of opening; and a driving force-limiting means which acts to limit the driving force generated by the engine to a certain level independent of the first and second throttle-driving means and to detect excessive spin of the drive wheels and which, when the throttle valve is directly driven by the accelerator operation mechanism, limits the driving force generated by the engine.

In one embodiment of the invention, the driving force-limiting means stops supply of fuel to the engine.

The first throttle-driving means mounted independent of the accelerator operation mechanism is controlled according to the position of the accelerator in the accelerator operation mechanism and according to the operating conditions of the engine and of the vehicle by the control means. The first throttle-driving means controls the throttle valve to a certain throttle opening. Therefore, if excessive spin of the drive wheels is detected on acceleration of the vehicle, the throttle valve is opened or closed by the first throttle-driving means to stop the drive wheels from spinning.

When the first throttle-driving means does not operate, the accelerator operation mechanism is operated by more than a given amount. Then, the throttle valve can be directly driven within the given range of opening. Accordingly, if the first throttle-driving means becomes inoperative for one cause or another, then the operation can be continued.

When the traction is controlled on acceleration to stop the drive wheels from spinning as described above, if the driver operates the accelerator operation mechanism to directly drive the first throttle-driving means, the driving force of the engine is limited to a certain level by the driving force-limiting means. Hence, sufficient traction and lateral drag are secured.

The driving force-limiting means consists of a fuel-cutting means which causes a fuel injection control means to deenergize the injector. Thus, the supply of fuel to the engine is stopped, and the driving force produced by the engine is suppressed.

Other objects and features of the invention will appear in the course of the description thereof which follows.

DETAILED DESCRIPTION OF THE INVENTION

Figure 1:
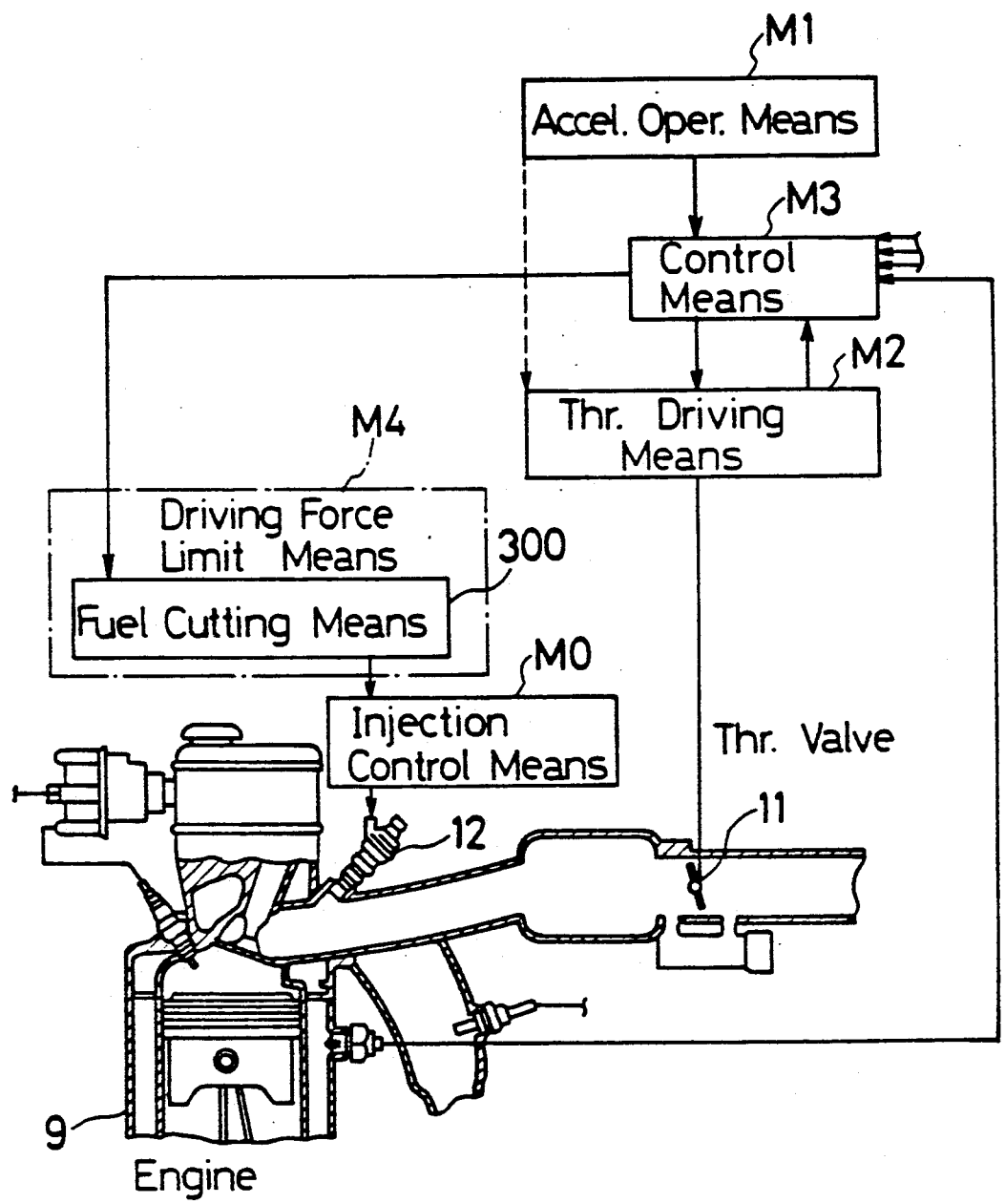
FIG. 1 is a schematic block diagram of a throttle control apparatus according to the invention.

Referring to FIG. 1, a throttle control apparatus according to the invention is shown diagrammatically. This apparatus comprises an accelerator operation mechanism M1, a throttle-driving means M2 which is mounted independent of the operation mechanism M1 and capable of opening and closing a throttle valve 11, and a control means M3 that controls the throttle-driving means M2 according to an intended throttle opening corresponding to the amount of operation of the accelerator operation mechanism M1 and also according to the operating conditions of the internal combustion engine 9 and of the vehicle. When excessive spin of the drive wheels is detected on acceleration of the vehicle, the control means M3 sets a second intended throttle opening for securing a given slip ratio and controls the throttle-driving means M2, for adjusting the throttle opening. When the throttle-driving means M2 becomes inoperative, the driver operates the accelerator operation mechanism M1 by more than a given amount to permit the throttle valve 11 to be directly driven within a given range of opening. The apparatus further includes a driving force-limiting means M4 which limits at least the driving force generated by the engine 9 to a certain driving force, independent of the throttle-driving means M2. When excessive spin of the drive wheels is detected and the driver wants to directly drive the throttle valve 11, the driving force-limiting means M4 is operated to limit the driving force produced by the engine 9.

The driving force-limiting means M4 can be a fuel-cutting means 300 that stops supply of fuel to the engine 9. As shown in FIG. 1, the fuel-cutting means 300 is connected with a fuel injection control means M0 which controls energization of the injector 12. The fuel-cutting means 300 deenergizes the injector 12 according to the output from the control means M3.

In FIG. 1, the fuel-cutting means 300 is separated from the fuel injection control means M0. It is also possible to include the function of the fuel-cutting means 300 in the fuel injection control means M0. In this case, the control means M3 is directly connected with the fuel injection control means M0.

In this throttle control apparatus, the control means M3 controls the throttle-driving means M2 according to the operation of the accelerator in the accelerator operation mechanism M1 and according to the operating conditions of the internal combustion engine 9 and of the vehicle, the throttle-driving means M2 being mounted independent of the accelerator operation mechanism M1. The throttle valve 11 is opened or closed by the throttle-driving means M2 to control the throttle opening to a given opening. Therefore, when excessive spin of the drive wheels is detected, the throttle-driving means M2 opens or closes the valve 11 to stop the wheels from spinning when the vehicle is accelerated.

When the throttle-driving means M2 does not operate, the driver operates the accelerator operation mechanism M1 by more than a given amount. This permits the throttle valve 11 to be directly driven within a given range of opening. Thus, if the throttle-driving means M2 becomes inoperative for one cause or another, the driver can continue running the vehicle.

When the traction is controlled to stop the drive wheels from spinning on acceleration of the vehicle, if the throttle-driving means M2 is directly driven by driver's operation of the accelerator operation mechanism M1, the driving force produced by the engine 9 is limited to a certain level by the driving force-limiting means M4. This assures that sufficient traction and lateral drag are produced.

The driving force-limiting means M4 can consist of a fuel-cutting means 300 which causes the fuel injection control means M0 to deenergize the injector 12, for stopping supply of fuel to the engine 9. The preferred example of the throttle control apparatus is described below.

Figure 2:
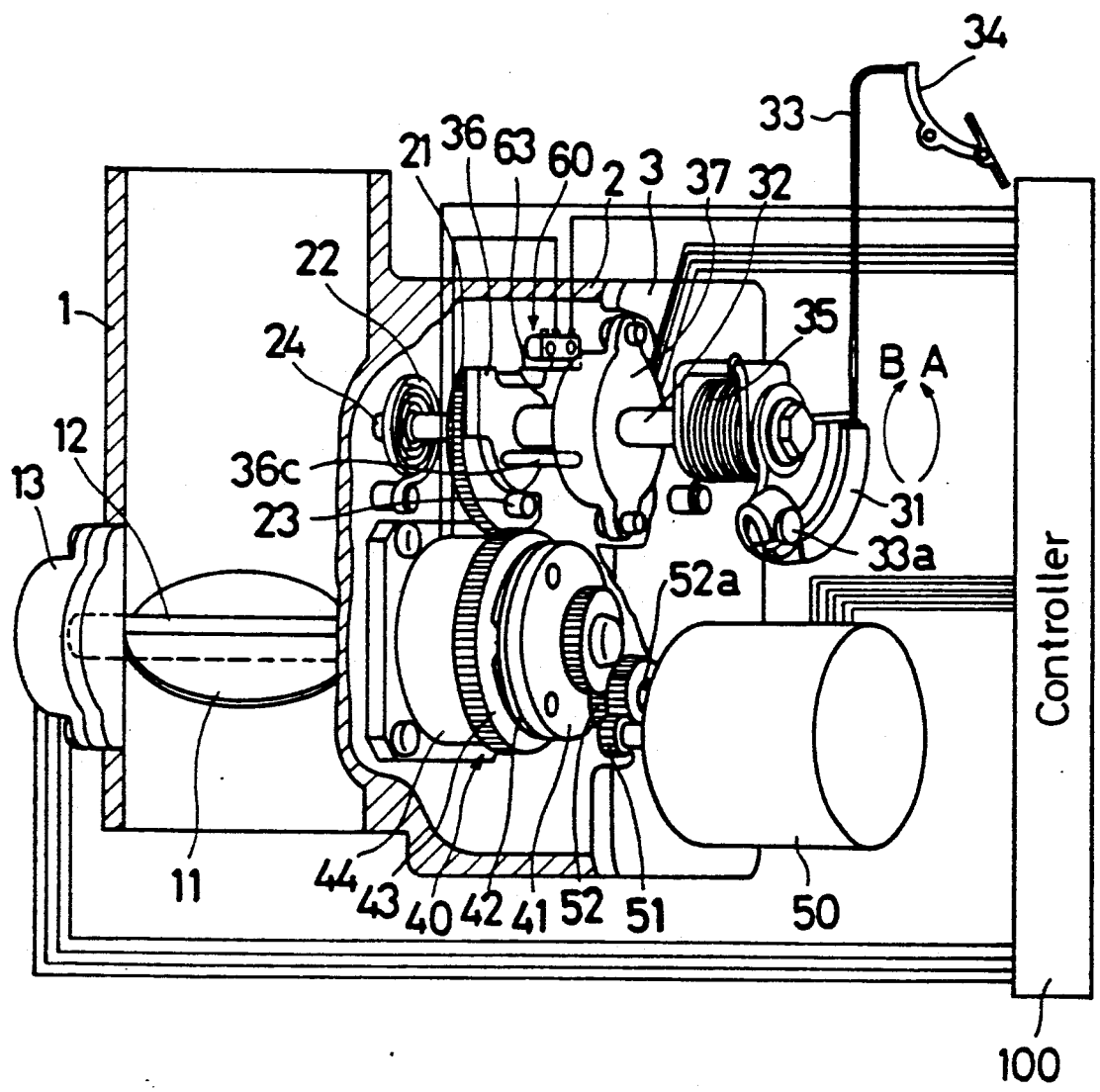
FIG. 2 is a partially cutaway perspective view of one example of the throttle control apparatus shown in FIG. 1.
Figure 3:
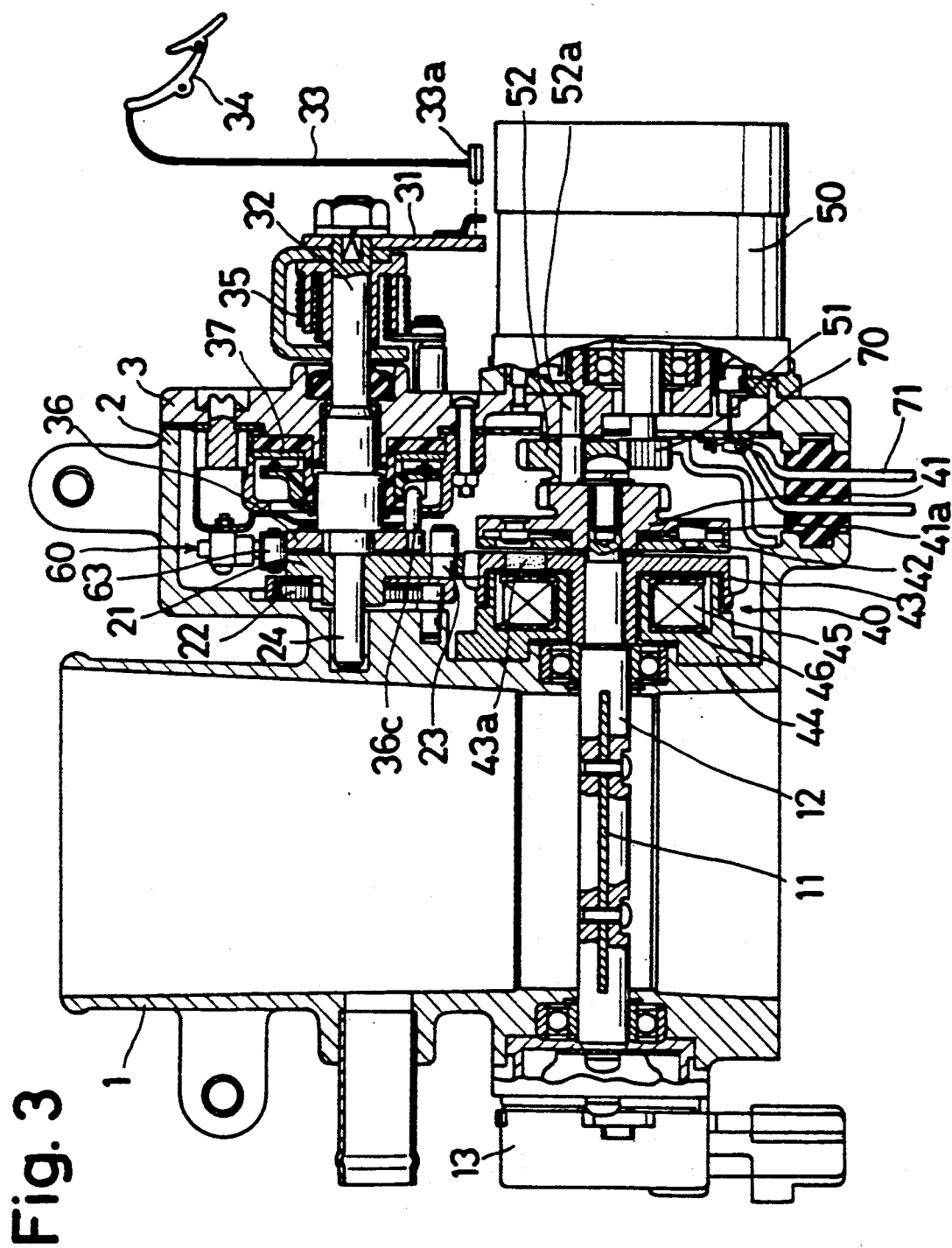
FIG. 3 is a vertical cross section of the apparatus shown in FIG. 2.

Referring to FIGS. 2 and 3, the throttle body of an internal combustion engine is indicated by numeral 1. A throttle valve 11 is rotatably held by a throttle shaft 12 in the intake passage formed in the throttle body 1. A case 2 is formed integrally with the side surface of the body 1 to which one end of the shaft 12 is supported. A cover 3 is coupled to the case 2. A chamber is formed by these parts. Some components of the preferred example of the control apparatus according to the invention is accommodated in this chamber. A throttle sensor 13 is attached to the side surface of the throttle body 1 to which the other end of the shaft 12 is supported, on the opposite side of the case 2.

The throttle sensor 13 has a detector for detecting the opening of the throttle valve 11, and is connected to the throttle shaft 12. The angular displacement of the shaft 12 is transformed into an electrical signal by the sensor 13. As an example, an idle switching signal and a signal indicating the throttle opening are delivered to a controller 100.

A movable yoke 43 is rigidly fixed to the other end of the throttle shaft 12. The throttle valve 11 rotates with the movable yoke 43. As can be seen from FIG. 3, the yoke 43 takes the form of a disk having a shaft portion firmly fixed to the throttle shaft 12. The yoke 43 is made from a magnetic substance. A stationary yoke 44 is also made from a magnetic substance and similar in shape to the movable yoke 43. The movable yoke 43 and the stationary yoke 44 are fitted together with a certain gap between them such that their opening ends are opposite to each other and that their side walls and shaft portions axially overlap with each other. The stationary yoke 44 is rigidly fixed to the throttle body 1. A coil 45 wound on a bobbin 46 made from a nonmagnetic substance is inserted in the spaces formed between the shaft portions and the side walls. A friction member 43a made from a nonmagnetic substance is embedded in the movable yoke 43 near its bottom around the throttle shaft 12. A driving plate 41 is disposed opposite to the friction member 43a. A disklike clutch plate 42 made from a magnetic substance is interposed between the friction member 43a and the driving plate 41. A solenoid clutch mechanism 40 is formed by these components.

The driving plate 41 assumes the form of a disk having a shaft portion in its center. The shaft portion is held so as to be rotatable around the throttle shaft 12. Outer teeth are formed on the shaft portion of the plate 41 and in mesh with outer teeth formed on a narrow portion of a gear 52 (described later). As shown in FIG. 3, the aforementioned clutch plate 42 is coupled to the bottom surface of the driving plate 41 via a leaf spring 41a. The clutch plate 42 is biased toward the plate 41 by the spring 41a. When the coil 45 is not energized, the plate 42 is apart from the movable yoke 43.

The gear 52 that is in mesh with the driving plate 41 is a stepped cylinder having a wide portion as well as the narrow portion. Outer teeth are formed on the wide portion and on the narrow portion. The gear 52 is held so as to be rotatable around a shaft 52a which is rigidly fixed to the cover 3. A motor 50 is mounted to the cover 3. The rotating shaft of the motor 50 extends parallel to the shaft 52a and is held so as to be rotatable relative to the shaft 52a. A gear 51 is firmly affixed to the front end of the rotating shaft of the motor 50 and in mesh with the outer teeth on the wide portion of the gear 52. In the present example, a stepping motor is used as the motor 50 which is controlled by a controller 100. Another type of motor such as a DC motor can be used as the motor 50.

When the motor 50 is driven to rotate the gear 51, the gear 52 is rotated, so that the driving plate 41 in mesh with the gear 52 is rotated with the clutch plate 42 around the throttle shaft 12. At this time, if the coil 45 shown in FIG. 3 is not energized, the clutch plate 42 is biased away from the movable yoke 43 by the force of the leaf spring 41a. That is, in this case, the movable yoke 43, the throttle shaft 12, and the throttle valve 11 can rotate independent of the driving plate 41. When the movable yoke 43 and the stationary yoke 44 are energized, the clutch plate 42 is attracted toward the movable yoke 43 by the produced electromagnetic force and makes contact with the yoke 43 against the biasing force of the leaf spring 41a. Thus, the plate 42 makes frictional contact with the movable yoke 43, and they rotate as a unit while coupled together with the assistance of the action of the friction member 43a. That is, the driving plate 41, the clutch plate 42, the movable yoke 43, the throttle shaft 12, and the throttle valve 11 are rotated as a unit by the motor 50 via the gears 51 and 52. In this way, a throttle-driving means according to the invention is constituted by these components.

An accelerator shaft 32 extends parallel to the throttle shaft 12 outwardly from the cover 3 and is rotatably held to the cover 3. An accelerator link 31 forming a rotating lever is fixedly mounted to the protruding end of the accelerator shaft 32. A pin 33a that is rigidly fixed to one end of an accelerator cable 33 is anchored to the front end of the link 31. A return spring 35 is connected to the link 31 to bias the link 31 and the shaft 32 in such a direction as to close the throttle valve 11. The other end of the cable 33 is connected with the accelerator pedal 34 to form an accelerator operation mechanism in which the accelerator link 31 and the accelerator shaft 32 are rotated about the axis of the accelerator shaft 32 according to operation of the accelerator pedal 34.

An accelerator plate 36 is mounted between the throttle body 1 and the cover 3 and rigidly mounted to the accelerator shaft 32 in the case 2. A throttle plate 21 is disposed opposite to the accelerator plate 36 and firmly mounted to the narrow portion 24 of the shaft 32.

The throttle plate 21 has a central portion held to the narrow portion 24 of the accelerator shaft 32. The plate 21 further includes a narrow portion and a wide portion which are shifted circumferentially with respect to each other. As shown in FIG. 2, outer teeth are formed on the outer surface of the wide portion and in mesh with the aforementioned outer teeth formed on the movable yoke 43. When the yoke 43 is driven, the throttle plate 21 is rotated. Conversely, the movable yoke 43 rotates in response to rotation of the throttle plate 21. The throttle shaft 12 and the throttle valve 11 which are coupled to the yoke 43 are rotated.

A step is formed at the boundary between the narrow portion and the wide portion of the throttle plate 21 to constitute an end surface cam on the side surface on the outer periphery. A pin 23 is attached to the wide portion of the plate 21. One end of a return spring 22 is anchored to the shaft portion of the plate 21, the other end being anchored to a pin extending upright from the case 2. Therefore, the throttle plate 21 is biased in the direction indicated by the arrow B in FIG. 2, i.e., in the direction to close the throttle valve 11, by the force of the return spring 22.

The accelerator plate 36 consists of a disk portion and an arm portion extending radially. The disk portion is rigidly fixed to the accelerator shaft 32 at its center. The disk portion has a narrow portion continuous with the arm portion. The disk portion is provided with a recess to form an end surface cam on the side surface on the outer periphery. A side surface of the arm portion is disposed opposite to the pin 23 of the throttle plate 21. When the accelerator plate 36 rotates in the direction indicated by the arrow A in FIG. 2 and the arm portion bears against the pin 23 of the plate 21, the accelerator plate 36 and the throttle plate 21 rotate as a unit. A pin 36c is attached to the accelerator plate 36 and extends upright axially of the accelerator shaft 32. In the condition shown in FIG. 2, the accelerator plate 36 and the throttle plate 21 are in their initial state. When the driving plate 41 is coupled to the movable yoke 43 by the solenoid clutch mechanism 40, the throttle valve 11 is rotated by the motor 50.

The cover 3 has a bearing portion supporting the accelerator shaft 32. An accelerator sensor 37 is rigidly fixed to the outer periphery of the this bearing portion. The sensor 37 is of the known construction, and consists of a member (not shown) on which a thick-film resistor is formed, together with a brush opposite to the resistor. The brush is disposed so as to engage the pin 36c of the accelerator plate 36. In this way, the angular position of the accelerator shaft 32 rotating with the accelerator plate 36 is detected. The sensor 37 is electrically connected with a printed circuit board 70 mounted between the case 2 and the cover 3. The board 70 is electrically connected with the controller 100 via leads 71.

A limit switch 60 interlocking with both throttle plate 21 and accelerator plate 36 is mounted to the case 3 via a stay and electrically connected with the printed circuit board 70, as shown in FIG. 3. The switch 60 has opposite contacts (not shown). A roller 63 is mounted at the front end of the switch 60.

As can be seen from FIGS. 2 and 3, the roller 63 is urged to bear against the side surface on the outer periphery of the throttle plate 21 and against the side surface on the outer periphery of the accelerator plate 36. Therefore, the roller 63 follows movement of the end surface cams formed on the throttle plate 21 and the accelerator plate 36, respectively. As the roller 63 moves in this way, the opposite contacts make or break contact with each other. The opposite contacts of the limit switch 60 are kept in contact with each other except when the accelerator pedal 34 is operated by less than the given amount, i.e., the accelerator plate 36 is rotated through an angle less than a given angle, and simultaneously the throttle plate 21 is rotated through an angle exceeding a given angle.

If the accelerator pedal 34 is operated by less than the given amount, e.g., the accelerator plate 36 is in the condition shown in FIG. 2 and the pedal is operated by an amount almost equal to null, and if the opening of the throttle valve 11 exceeds a given angle, i.e., the throttle plate 21 is rotated through an angle exceeding the given angle in the direction indicated by the arrow A in FIG. 2, then the roller 63 bears against the narrow portions of the throttle plate 21 and of the accelerator plate 36. As a result, the opposite contacts break contact with each other.

Figure 4:
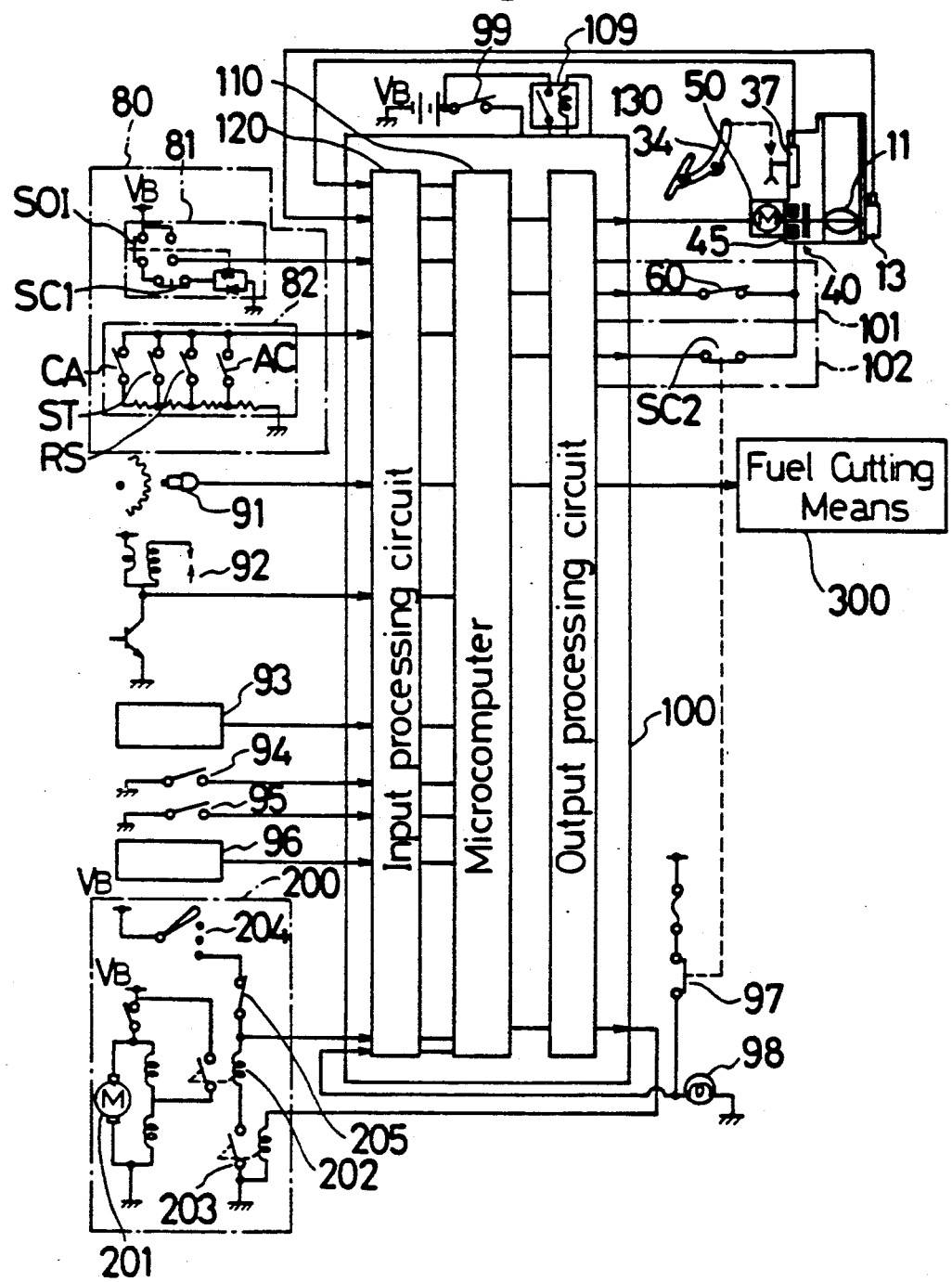
FIG. 4 is a circuit diagram of the apparatus shown in FIGS. 2 and 3, and in which a controller and input and output devices are added.

The controller 100 is a control circuit including a microcomputer and functions as a control means according to the invention. Specifically, the controller is installed on the vehicle, receives the output signals from various sensors as shown in FIG. 4, and provides various kinds of control, including control of the solenoid clutch mechanism 40 and the motor 50. In the present invention, the controller 100 provides cruise control and control of the traction for stopping the drive wheels from spinning on acceleration, as well as normal control in response to the position of the accelerator pedal.

Referring to FIG. 4, the controller 100 has the microcomputer 110, an input processing circuit 120 connected with the microcomputer, and an output processing circuit 130 to which the motor 50 is connected. The coil 45 of the solenoid clutch mechanism 40 is connected with the output processing circuit 130 via a first energizing circuit 101 and a second energizing circuit 102. The controller 100 is connected with a power supply $V_B$ via the ignition switch 99 and a main relay 109.

The accelerator sensor 37 is connected with the input processing circuit 120 and delivers a signal indicating the position of the accelerator pedal 34. This signal is applied to the input processing circuit 120 together with the output signal from the throttle sensor 13. The controller 100 turns on or off the solenoid clutch mechanism 40 according to the operating conditions. The controller provides control of the motor 50 in such a way that the present throttle opening becomes equal to the opening of the throttle valve 11 determined by the amount by which the accelerator pedal 34 is depressed, i.e., the accelerator opening, the operating conditions of the engine, and the operating conditions of the vehicle.

A cruise control switch 80 is connected with the input processing circuit 120 and consists of a set of main switches 81 and a set of control switches 82 shown in FIG. 4. The main switch set 81 turns on or off the power supply for the whole cruise control system. The control switch set 82 performs various known switching functions.

When the vehicle is traveling, if the main switch set 81 is closed, and if a set switch ST of the control switch set 82 is closed for a short time, the vehicle speed obtained at this time is stored and this speed is maintained. An accelerate switch AC is used to fine adjust the set vehicle speed. When this switch is closed, the vehicle speed is increased. In order to fine adjust the vehicle speed so as to reduce it, the set switch ST is kept open. Alternatively, the driver once presses down on the brake pedal to cancel the cruise control and then the set switch ST is closed for a short time just when the speed has decreased to the desired speed. Thus, the set speed is reset to the desired lower speed. A cancel switch CA is employed to cancel cruise control. A resume switch RS is used to regain the original set speed after the cruise control is canceled by the operations of the above switches.

Wheel speed sensors 91 are used for providing cruise control and providing control of the traction for stopping the drive wheels from spinning on acceleration, and each consists of a well-known solenoid pickup sensor, Hall sensor, or the like. In FIG. 4, only one of the sensors 91 is shown. These sensors 91 are installed on the drive wheels and on the driven wheels (not shown), respectively. An ignition system 92 is connected with the controller 100 to apply a signal for ignition to detect the engine speed.

A transmission controller 93 is an electronic control unit that controls the automatic transmission. The controller 93 receives signals from the wheel speed sensors 91, the throttle sensor 13, and other sensors, and monitors the operating conditions of the engine and of the vehicle. The microcomputer calculates the position of the gear and produces a gear change signal and a timing signal according to the operating conditions. The solenoid valve is actuated in response to the gear change signal and other signals, and the hydraulic pressure to the brakes or to the clutch is controlled to shift the gear. The gear change signal from the transmission controller 93 and other signals are supplied to the controller 100.

Maps showing the relations of the opening of the throttle valve 11 to the position of the accelerator pedal 34 have been previously set for various modes of operation and are stored in the microcomputer 110. A mode selector switch 94 selects an appropriate one out of the maps to set the opening of the valve 11 to an opening corresponding to the mode of operation. These various modes of operation can include high power mode, economy mode, high-speed mode, and urban area mode. When the driver does not want to provide control of the traction for stopping the drive wheels from spinning on acceleration, he or she operates an inhibit switch 95 to cause the microcomputer 110 to produce a signal for inhibiting this mode of operation. When the traction is controlled to stop the drive wheels from spinning on acceleration, a steering sensor 96 senses whether the steering wheel has been rotated. An intended slip ratio is set according to the result. A brake switch 97 is opened or closed according to the position of the brake pedal (not shown). When the switch 97 is closed, a brake lamp 98 is lit up. At the same time, a normally closed switch SC2 is opened to open the second energizing circuit 102 that is connected with the solenoid clutch mechanism 40 for cruise control.

A starter circuit 200 drives a starter motor 201. A first relay 202 opens or closes the driver circuit for the motor 201. A second relay 203 is connected in series with the coil of the first relay 202. The second relay 203 is controlled according to the output signal from the controller 100. A starter switch 204 is connected in series with the first relay 202 and with the second relay 203. A neutral start switch 205 is interposed between the starter switch 204 and the first relay 202 provided that the vehicle is equipped with an automatic transmission. When the automatic transmission (not shown) is in neutral, the neutral start switch 205 is closed. Under this condition, if the starter switch 204 is closed, and if the second relay 203 is in closed condition, then the coil of the first relay 202 is energized. This turns on the driver circuit for the starter motor 201 to drive the motor 201.

An initial check is done to see whether the present throttle control apparatus functions normally. During this check, the second relay 203 is kept deenergized even if the starter switch 204 is closed. In this way, the starter motor 201 is not driven until the check is actually performed by opening and closing the throttle valve 11. This prevents the engine from rotating at an excessively high speed during the initial check of the throttle control apparatus.

A fuel-cutting means 300 forming a driving force-limiting means according to the invention is connected with the output processing circuit 130.

Figure 5:
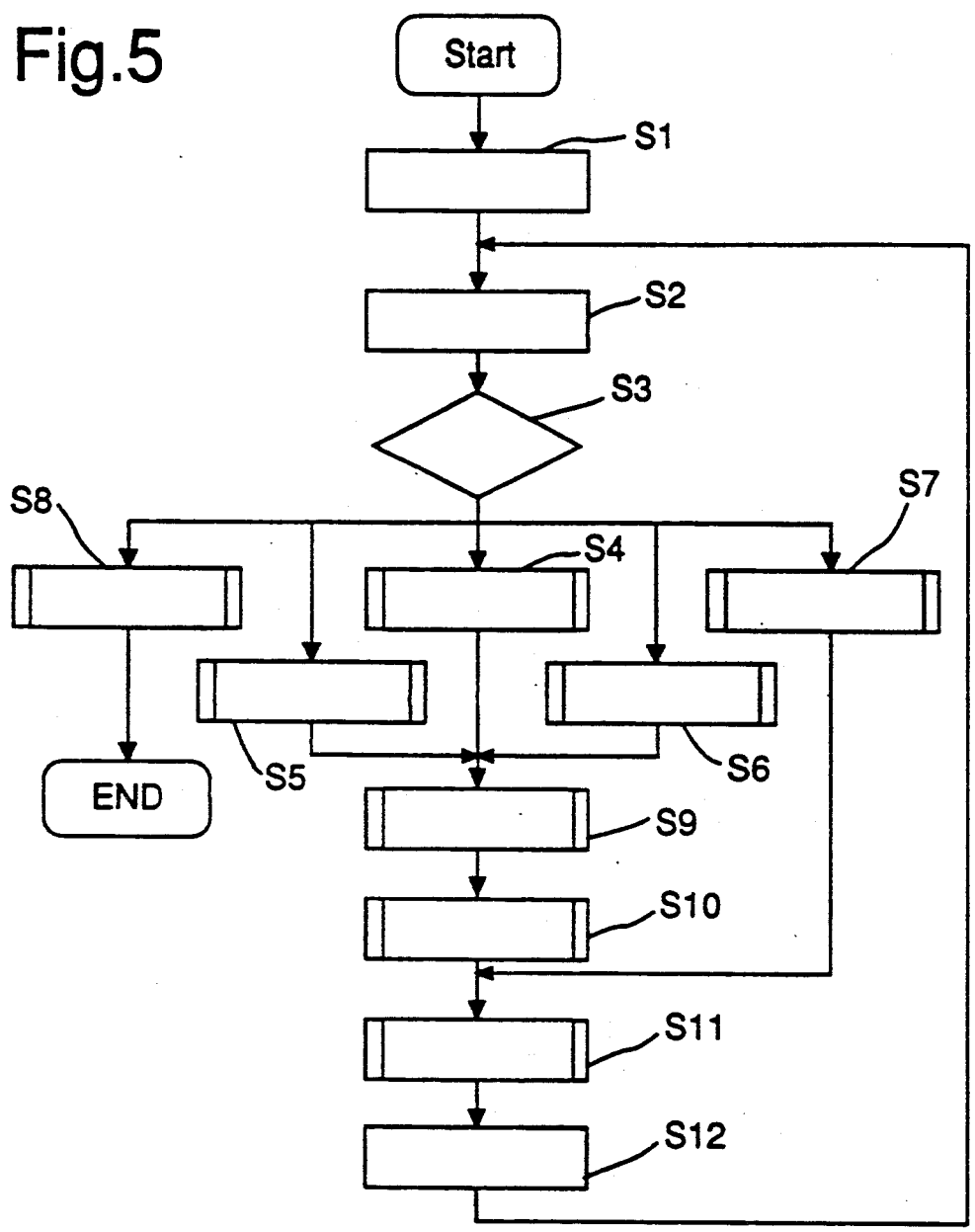
FIG. 5 is a flowchart illustrating the general operation of the apparatus shown in FIGS. 2–4.

The operation of the throttle control apparatus constructed as described thus far is next described. FIG. 5 is a flowchart illustrating the general operation of the throttle control apparatus. The apparatus is initialized by the controller 100 (step 1). The aforementioned various input signals to the input processing circuit 120 are processed (step 2). Then, control proceeds to step 3, where one control mode is selected according to the input signals. That is, one is selected out of steps 4–8.

When steps 4-6 are carried out, the torque is controlled (step 9). Then, the throttle opening is controlled according to the angular position of the steering wheel (not shown) when the vehicle is turning a corner (step 10). The idling speed is maintained at a constant value if the condition of the engine varies (step 7). After the ignition switch 99 is opened, an after treatment is made (step 8). A self diagnosis is made by a diagnosing means to perform processing in case of a failure (step 11). The output signal is processed to drive the solenoid clutch mechanism 40 and the motor 50 via the output processing circuit 130 (step 12). The routine described above is repeated at fixed intervals of time.

The general operation described above is next described in further detail. The operation perfor..ed when normal accelerator control mode (step 4) is selected is first described. When the accelerator pedal 34 is not depressed, i.e., when the throttle valve 11 is fully closed, the throttle plate 21 and the accelerator plate 36 are located as shown in FIG. 2. The limit switch 60 is open. The coil 45 of the solenoid clutch mechanism 40 is energized via the first energizing circuit 101.

When the coil 45 is energized to energize the stationary yoke 44 and the movable yoke 43, the clutch plate 42 is coupled to the movable yoke 43. In this state, the driving force of the motor 50 is transmitted to the throttle shaft 12. Then, the shaft 12 is rotated by the motor 50 unless abnormality takes place. Thus, the opening of the throttle valve 11 is controlled by the motor 50, which is, in turn, controlled by the controller 100.

More specifically, in the normal accelerator control mode, if the driver pushes down on the accelerator pedal 34, then the accelerator link 31 is rotated according to the amount by which the pedal is operated, against the biasing force of the return spring 35. As such, the accelerator plate 36 is rotated in the direction indicated by the arrow A in FIG. 2, and the limit switch 60 is kept closed. The accelerator sensor 37 interlocking with the plate 36 via the pin 36c shown in FIG. 2 detects the angular position of the plate 36 corresponding to the amount by which the accelerator pedal 34 is operated.

The output signal from the accelerator sensor 37 is applied to the controller 100 to find a desired throttle opening corresponding to the angular position of the accelerator plate 36. For example, the amount by which the accelerator is operated, i.e., the intended throttle opening $\theta s$ corresponding to the angular position of the plate 36, is set according to the characteristic indicated by the dot-and-dash line in FIG. 8. When the motor 50 is driven to rotate the throttle shaft 12, a signal corresponding to the angular position is delivered from the throttle sensor 13 to the controller 100. The motor 50 is controlled by the controller 100 in such a way that the throttle opening of the throttle valve 11 substantially equals the intended throttle opening $\theta s$. In this way, the throttle valve is controlled according to the amount by which the accelerator pedal 34 is operated. Hence, the output of the engine corresponds to the opening of the valve 11.

During the operation of the throttle valve 11, the accelerator plate 36 and the throttle plate 21 do not engage. The plate 36 follows rotary movement of the plate 21 with a given angle between them. Therefore, the accelerator pedal 34 is not mechanically coupled to the throttle valve 11. This assures that the vehicle smoothly starts and travels. If the driver no longer pushes down on the accelerator pedal 34, the biasing force of the return spring 35 and the driving force of the motor 50 return the accelerator link 31 to its initial position. The throttle valve 11 is fully closed.

In the above-described normal acceleration mode, if the throttle valve 11 malfunctions, then the driver stops from pressing down on the accelerator pedal 34. The return spring 35 then moves the accelerator plate 36 back to its initial position, thus opening the limit switch 60. As a result, the first energizing circuit 101 is opened. However, the second energizing circuit 102 for cruise control is open and so the coil 45 is deenergized. The movable yoke 43 of the solenoid clutch mechanism 40 is separated from the clutch plate 42. Then, the driving plate 41 stops from driving the throttle valve 11. The valve 11 is returned to its initial position by the return spring 22.

In the cruise control mode of step 5, a normally open switch S01 of the main switch set 81 shown in FIG. 4 is operated and then the set switch ST of the control switch set 82 is operated. Electrical current is supplied to the coil 45 via the normally closed switch SC2 to energize the coil. In this case, when the opening of the throttle valve 11 is in excess of a certain opening, if the driver stops from pushing down on the accelerator pedal 34, the limit switch 60 is opened to thereby open the first energizing circuit 101. In the cruise control mode, however, the coil 45 is kept energized via the second energizing circuit 102. Therefore, the throttle shaft 12 is coupled to the motor 50 via the solenoid clutch mechanism 40. The intended throttle opening is set according to the difference between the vehicle speed detected by the wheel speed sensors 91 and the vehicle speed set by the set switch ST. The throttle valve 11 is driven by the motor 50 in such a way that the intended throttle opening is attained.

When the vehicle is running at a constant speed, if it is necessary to accelerate the vehicle to pass another car ahead, the driver pushes down on the accelerator pedal 34. If the throttle opening corresponding to the amount of operation of the accelerator pedal 34 in the normal acceleration mode exceeds the intended throttle opening set for the cruise control mode, then the mode is switched to overriding mode. The intended throttle opening is replaced by the opening set for the normal acceleration mode.

In order to cancel the cruise control mode, the driver operates the cancel switch CA of the control switch set 82 shown in FIG. 4 or the normally closed switch SC1 to open the main switch set 81, thus opening the second energizing circuit 102. The same result arises when the ignition switch 99 is opened. Also, when the driver pushes down on the brake pedal, the normally closed switch SC2 interlocking with the brake switch 97 is opened, thus opening the second energizing circuit 102. Thereafter, the throttle valve is controlled via the first energizing circuit 101 in the same way as in the above-described normal acceleration mode.

When step 6 is carried out to control the traction for stopping the drive wheels from spinning on acceleration, the throttle control apparatus operates in the manner described below. The wheel speed sensors 91 (FIG. 4) detect the speed Vw of the drive wheels (not shown) and the speed Vr of the driven wheels (not shown). The controller 100 calculates an estimated body speed Vb from the average value of the right and left driven wheels. The slip ratio given by $$S = (Vw - Vb)/Vw \qquad (1)$$

is calculated.

When the vehicle starts or accelerates, if the slip ratio S exceeds a given value, say 10%, then it is determined that the driving wheels are spinning. The spin stop mode is selected (step 3) (FIG. 5). The intended throttle opening of the throttle valve 11 is calculated (step 6). More specifically, the controller 100 sets the given slip ratio, say 10%, of the drive wheels which provides sufficient traction and lateral drag with the road surface. Then, the intended throttle opening for securing this ratio is calculated. The motor 50 is controlled so that the throttle valve 11 attains the intended throttle opening. Processing performed in the spin stop mode is described later by referring to FIG. 6.

Figure 9:
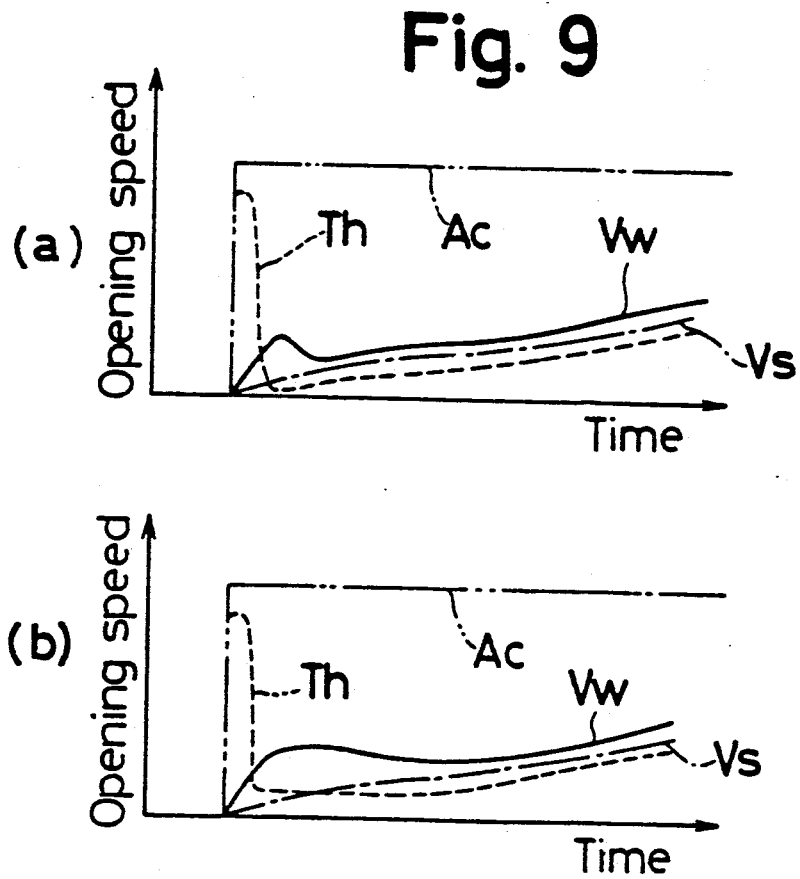
FIG. 9(a) is a graph showing the conditions in which the traction is controlled only with a throttle-driving means by the throttle control apparatus shown in FIGS. 2–4 to stop the drive wheels from spinning on acceleration.
FIG. 9(b) is a graph similar to FIG. 9(b), but in which the throttle valve is directly driven by the accelerator operation mechanism.

If the slip ratio S drops below a given value, and if the intended throttle opening exceeds the throttle opening $\theta$s set for the normal acceleration mode illustrated in FIG. 9, then processing in the spin stop mode ends, and the normal acceleration mode is regained. During this process, the opening of the throttle valve 11 is controlled by the motor 50 and, therefore, no shock is given to the accelerator pedal 34 when the mode is switched between the spin stop mode and the normal acceleration mode.

When the throttle sensor 13 and the accelerator sensor 37 sense that the opening of the throttle valve 11 and the amount of operation of the accelerator pedal 34 are lower than given values, idling speed control mode of step 7 (FIG. 5) is initiated. The motor 50 is controlled in such a manner that the intended engine speed set according to the temperature of the coolant and the operating conditions of the engine such as load is attained.

If the present throttle control apparatus produces a trouble, making it impossible to operate the motor 50 forming the throttle-driving means, then the driver can continue running the vehicle by pushing down on the accelerator pedal 34. In particular, as can be seen from FIG. 2, by pressing down on the pedal by more than a given amount, the arm portion 36c of the accelerator plate 36 is rotated toward the pin 23 of the throttle plate 21, so that the arm 36c engages the pin 23. This drives the movable yoke 43 in such a direction that the throttle valve 11 is opened. The result is that a certain opening $\theta$a is secured as indicated by the solid line in FIG. 8. Consequently, the driver is able to continue running the vehicle, though at a low speed.

Figure 6:
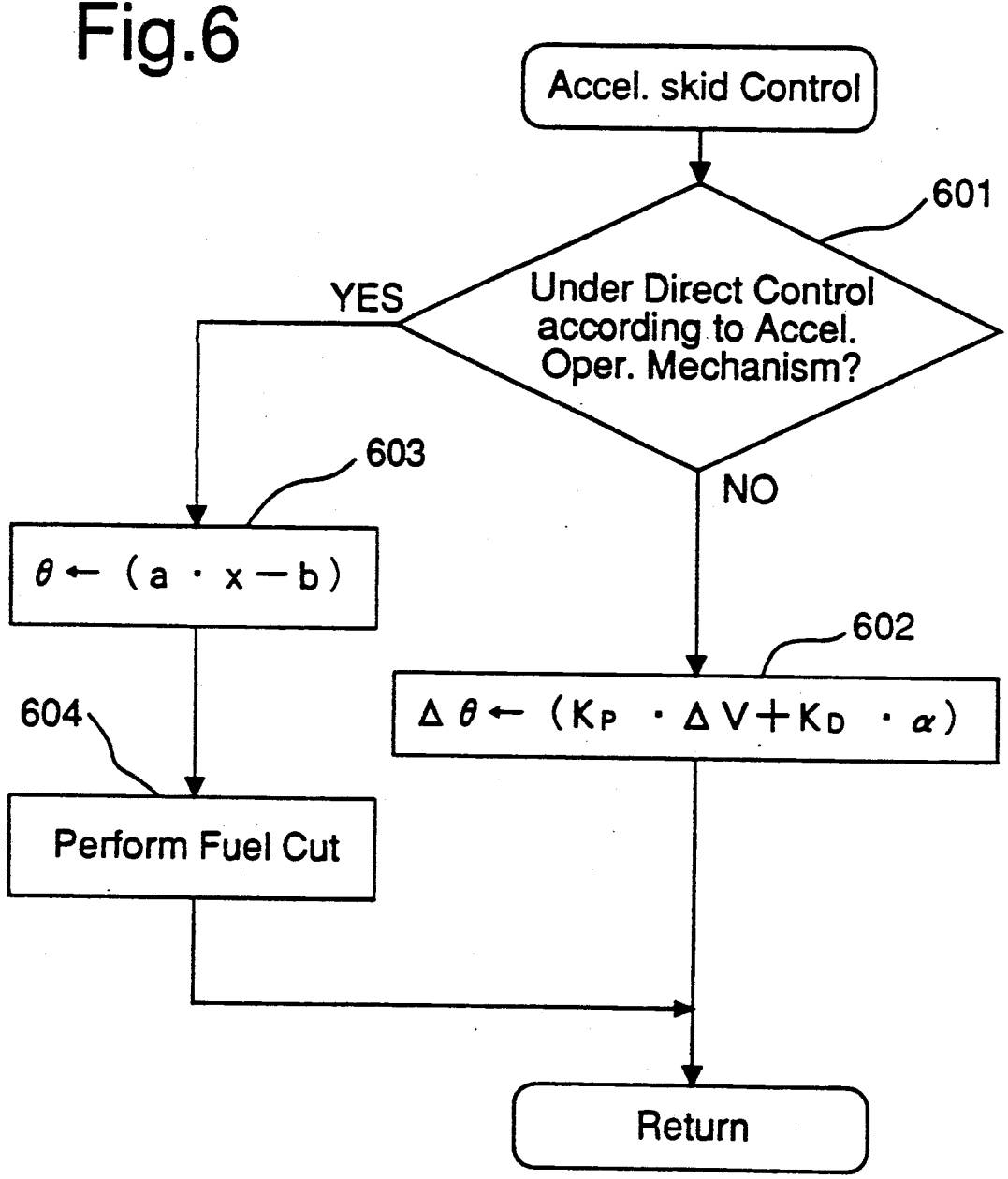
FIG. 6 is a flowchart illustrating the routine included in the flowchart of FIG. 5 for stopping the drive wheels from spinning on acceleration.

FIG. 6 illustrates processing performed in spin stop mode of step 6 (FIG. 5). A decision is made to see whether the throttle control apparatus is under direct control of the throttle operation mechanism (step 601).

If the throttle valve 11 is not directly driven by operating the accelerator pedal 34, then the deviation $\Delta\theta$ from the present throttle opening $\theta$ is calculated, using the following equation, to maintain the slip ratio of the drive wheels at the optimum value, for example 10% (step 602).

$$\Delta\theta = K_P \Delta V + K_D \cdot a \qquad (2)$$

where $\Delta V$ is the difference between the speed Vw of the drive wheels and the reference speed Vs, a is a value obtained by differentiating the difference $\Delta V$, $K_P$ and $K_D$ are constants. The reference value Vs is the value of the estimated vehicle body speed Vb when the slip ratio is a given value, say 10%, which provides sufficient traction and lateral drag. The constants $K_P$ and $K_D$ differ, depending on the dimensions of the vehicle and of the engine. Therefore, these constants are set for each individual vehicle.

Step 12 of FIG. 5 is carried out to control the throttle opening $\theta$ in such a way that the speed difference $\Delta V$ is reduced down to zero, i.e., the deviation $\Delta\theta$ is reduced down to zero. Hence, sufficient traction and lateral drag are obtained.

Figure 8:
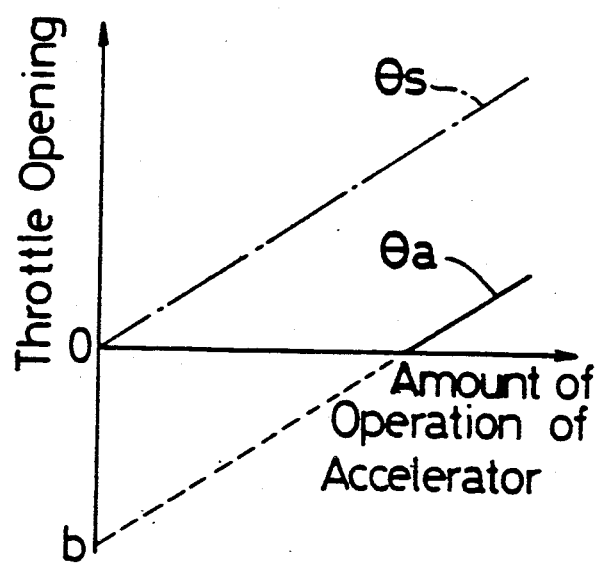
FIG. 8 is a graph showing the relation of the throttle opening to the amount by which the accelerator is operated, the relation being utilized by the throttle control apparatus shown in FIGS. 2–4.

When the driver presses down on the accelerator pedal 34 to directly open the throttle valve 11, control goes to step 603, where the throttle opening $\theta$ is calculated, using the equation $$\theta = a \cdot x - b \qquad (3)$$

where x is the amount of operation of the accelerator plotted on the horizontal axis of the graph of FIG. 8, b is the value at the intersection with the vertical axis, and a is the tilt of the throttle opening $\theta$a. In particular, the accelerator pedal 34 is operated to drive the motor 50 and other components until the throttle opening $\theta$a which would normally obtained by directly driving the throttle valve 11 is realized. At this time, the motor 50 does not fail to operate and so the throttle valve 11 is closed until the opening $\theta$a is attained.

After the throttle opening $\theta$ is controlled to the opening $\theta$a corresponding to the position of the accelerator pedal 34 in this way, control proceeds to step 604, where the supply of fuel is cut by the fuel-cutting means 300 that is one example of the driving force-limiting means. As shown in FIG. 1, fuel is supplied from the fuel tank (not shown) into the injector 12 mounted to the engine 9 by a fuel pump (not shown). A fuel injection control means M0 electrically controls the injector 12 to inject fuel into the engine 9. The fuel-cutting means 300 is connected with the injection control means M0 which is so controlled that the injector 12 is deenergized. As a result, the supply of fuel to the engine 9 is stopped. It is to be noted that only one cylinder is shown in FIG. 1. In practice, every cylinder is provided with such an injector. The fuel-cutting means 300 acts for all the injectors of the cylinders.

Figure 7:
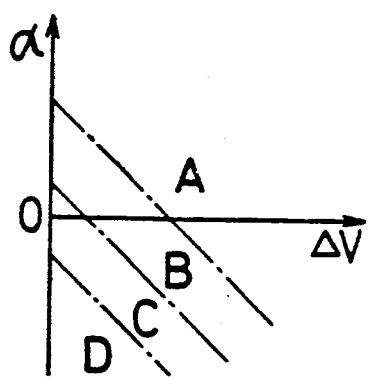
FIG. 7 is a graph used for setting conditions under which supply of fuel is cut.

The amount of fuel supplied to each cylinder is set according to the maps stored in the microcomputer 110 and utilizing the graph of FIG. 7. In this graph, the difference $\Delta V$ between the speed Vw of the drive wheels and the reference vehicle speed Vs is plotted on the horizontal axis, while the rate of change a of this difference $\Delta V$, i.e., the differentiated value, is plotted on the vertical axis. Four regions defined by the dot-and-dash lines are formed. In region A, fuel is cut about three of the four cylinders. In region B, fuel is cut about two of them. In region C, fuel is cut about one of them. In region D, fuel is not cut.

In the present example, the fuel-cutting means 300 is used as the driving force-limiting means. The driving force-limiting means can also be appropriate control of the brakes for limiting the rotation of the drive wheels. Furthermore, the driving force-limiting means may comprise the fuel-cutting means 300 together with appropriate control of the brakes.

Since the novel throttle control apparatus is built as described thus far, it yields the following advantages. When the accelerator is controlled in a normal manner, the opening of the throttle valve is adjusted by the throttle-driving means according to the operation of the accelerator operation mechanism. If the throttle-driving means becomes inoperative, then the throttle valve can be directly operated by operating the accelerator operation mechanism by more than a given amount. In addition, when the accelerator operation mechanism is operated by a large amount and the throttle valve is directly driven by the accelerator operation mechanism in the spin stop mode, the driving force generated by the internal combustion engine is restricted by the driving force-limiting means different from the throttle-driving means. Thus, sufficient traction and lateral drag can be produced between the vehicle and the road surface. Consequently, when the vehicle accelerates, the drive wheels are certainly stopped from spinning.

What is claimed is:

1. A throttle control apparatus comprising:

an accelerator operation mechanism;

a first throttle-driving means which is mounted independent of the accelerator operation mechanism and capable of opening and closing a throttle valve of a vehicle;

a control means which controls the first throttle-driving means according to the operating conditions of an internal combustion engine and of the vehicle and based on a first intended throttle opening corresponding to the amount by which the accelerator operation mechanism is operated, the control means acting to set a second intended throttle opening for securing a given slip ratio and then to control the first throttle-driving means for adjusting the throttle opening when excessive spin of the drive wheels is detected on acceleration of the vehicle;

a second throttle-driving means which, when the first throttle-driving means becomes inoperative and the accelerator operation mechanism is operated by more than a given amount, can directly drive the throttle valve within a given range of opening; and a driving force-limiting means which acts to limit the driving force generated by the engine to a certain level independent of the first and second throttle-driving means and to detect excessive spin of a plurality of drive wheels and which, when the throttle valve is directly driven by operation of the accelerator operation mechanism, limits the driving force generated by the engine.

2. The throttle control apparatus of claim 1, wherein said driving force-limiting means is a fuel-cutting means which stops supply of fuel to the internal combustion engine.

* * * * *